(12) United States Patent
Verschuuren

(10) Patent No.: US 11,022,723 B2
(45) Date of Patent: Jun. 1, 2021

(54) LAMINATE COMPRISING ABRASION RESISTING LAYER, DEVICE COMPRISING THE SAME AND METHOD OF MANUFACTURING THE SAME

(71) Applicant: KONINKLIJKE PHILIPS N.V., Eindhoven (NL)

(72) Inventor: Marcus Antonius Verschuuren, Berkel-Enschot (NL)

(73) Assignee: Koninklijke Philips N.V., Eindhoven (NL)

( * ) Notice: Subject to any disclaimer, the term of this patent is extended or adjusted under 35 U.S.C. 154(b) by 195 days.

(21) Appl. No.: 16/332,004

(22) PCT Filed: Aug. 31, 2017

(86) PCT No.: PCT/EP2017/071921
§ 371 (c)(1),
(2) Date: Mar. 11, 2019

(87) PCT Pub. No.: WO2018/050448
PCT Pub. Date: Mar. 22, 2018

(65) Prior Publication Data
US 2019/0219738 A1 Jul. 18, 2019

(30) Foreign Application Priority Data
Sep. 13, 2016 (EP) ..................................... 16188588

(51) Int. Cl.
*G02B 27/00* (2006.01)
*G02B 1/118* (2015.01)
(Continued)

(52) U.S. Cl.
CPC ................ *G02B 1/118* (2013.01); *G02B 1/11* (2013.01); *G02B 1/14* (2015.01);
(Continued)

(58) Field of Classification Search
CPC .. G02B 1/118; G02B 1/14; G02B 1/11; G02B 1/00; G02B 1/10; G02B 1/113;
(Continued)

(56) References Cited

U.S. PATENT DOCUMENTS 7,576,915 B2 8/2009 Kurt
8,102,494 B2 1/2012 Nishida et al.
(Continued)

FOREIGN PATENT DOCUMENTS

CN 105304775 A 2/2016
JP 2012182160 A 9/2012

OTHER PUBLICATIONS

Wen-Fa Wu et al "Mechanical and Optical Properties of Ito Films With Anti-Reflective and Anti-Wear Coatings" Applied Surface Science 115 (1997) p. 96-102.
(Continued)

*Primary Examiner* — Arnel C Lavarias

(57) ABSTRACT

A laminate comprising an abrasion resisting layer that is disposed on a surface of an optically transmissive substrate, wherein the layer comprises a pattern of spatially separated protrusions of an abrasion-resistant material extending away from the surface, and silica interposed between the protrusions. The abrasion-resistant material has a Knoop hardness measured according to ASTM E384 Knoop Hardness Standard that is greater than that of the silica.

20 Claims, 17 Drawing Sheets

(51) Int. Cl.
*G02B 1/14* (2015.01)
*G02B 1/11* (2015.01)
*G02F 1/1335* (2006.01)
*B82Y 20/00* (2011.01)

(52) U.S. Cl.
CPC ........ *G02F 1/133502* (2013.01); *B82Y 20/00* (2013.01); *G02F 2201/38* (2013.01)

(58) Field of Classification Search
CPC ............... G02B 1/115; G02F 1/133502; G02F 2201/38; C03C 2217/73; C03C 2217/732; C03C 2217/78; C03C 2217/213; C03C 2217/214; C03C 2217/281; B82Y 20/00; B32B 2307/40; B32B 2307/50; B32B 2307/536
USPC ....... 359/609, 901, 577, 580, 581, 582, 586, 359/588, 589, 590
See application file for complete search history.

(56) References Cited

U.S. PATENT DOCUMENTS

| | | | |
|---|---|---|---|
| 8,878,122 B2 | 11/2014 | Yokogawa | |
| 8,885,252 B1* | 11/2014 | Mossberg | G02B 5/1871 359/567 |
| 9,291,748 B2 | 3/2016 | Momoki et al. | |
| 2008/0129184 A1 | 6/2008 | Nishida et al. | |
| 2013/0122282 A1 | 5/2013 | Didavide et al. | |
| 2013/0182328 A1 | 7/2013 | Stewart et al. | |
| 2015/0185413 A1* | 7/2015 | Greiner | B29D 11/0074 385/37 |
| 2015/0241603 A1 | 8/2015 | Fuji et al. | |
| 2016/0356925 A1 | 12/2016 | Lowrie | |
| 2019/0196063 A1* | 6/2019 | Gui | G02B 1/118 |
| 2020/0278487 A1* | 9/2020 | Calafiore | G02B 5/1857 |

OTHER PUBLICATIONS

Anonymous "Material Hardness Tables" Jul. 18, 2006 Retrieved from the Internet: URL:http://web.archive.org/web/20060718185045/ http://www.tedpella.com/company_html/hardness.htm [retrieved on Feb. 10, 2017].

J. W. Liou et al: "The concept of effective hardness in the abrasion of coarse two-phase materials with hard second phase particles", Journal of Materials Science, vol. 30, No. 1, Jan. 1, 1995 (Jan. 1, 1995), pp. 258-262.

* cited by examiner

US 11,022,723 B2

LAMINATE COMPRISING ABRASION RESISTING LAYER, DEVICE COMPRISING THE SAME AND METHOD OF MANUFACTURING THE SAME

CROSS-REFERENCE TO PRIOR APPLICATIONS

This application is the U.S. National Phase application under 35 U.S.C. § 371 of International Application No. PCT/EP2017/071921, filed on Aug. 31, 2017, which claims the benefit of EP Patent Application No. EP 16188588.4, filed on Sep. 13, 2016. These applications are hereby incorporated by reference herein.

FIELD OF THE INVENTION

The present invention relates to a laminate comprising an abrasion resisting layer disposed on a surface of an optically transmissive substrate, and a device comprising the laminate. The present invention further relates to a method of manufacturing the laminate.

BACKGROUND OF THE INVENTION

Optical interfaces such as a window pane or a touch screen would ideally be both scratch resistant and exhibit low reflectance. Scratch resistance is determined by the ability of the optical interface to withstand abrasion from common materials. One such common material is silica which is a common constituent of sand. Silica has a Knoop Hardness (HK) of 800-900 $g_F \cdot mm^{-2}$, measured according to ASTM E384 Knoop Hardness standard. Thus if an optical interface were to be made harder than silica (i.e. such that it has a Knoop hardness of, for instance, greater than 1000 $g_F \cdot mm^{-2}$), it would be able to resist abrasion by sand.

This problem may be addressed by employing hard, optically transmissive materials, such as sapphire, instead of glass, in order to prevent common scratches caused by contact with sand (silica), keys (steel) etc. However, increased hardness of materials tends to coincide with increasing refractive index, since both properties are related to the density of the material, such that harder materials cause increased reflectance (and thus lower transmittance) which is clearly undesirable for optical interface applications. For example, hard materials such as sapphire (HK=2000 $g_F \cdot mm^{-2}$) and diamond (HK=7000 $g_F \cdot mm^{-2}$) have refractive indices of 1.78 and 2.4 respectively. The higher refractive index of sapphire, for instance, means that its reflectance is close to twice that of glass. This is particularly disadvantageous in applications such as watch faces and touch screens in which light passes from air, through the optical interface, and back into air; reflectance thus occurring both upon entering and exiting the optical interface.

The issue of increased reflectance may be addressed by applying an anti-reflection coating to a hard material (e.g. sapphire), but this may not improve scratch resistance since such coatings (e.g. MgF$_2$ (HK=415 $g_F \cdot mm^{-2}$) or polymer layers) tend to be softer than the hard material on which they are applied.

Alternatively, a harder protective layer can be applied to a softer material (e.g. glass) in order to protect the softer material from abrasion. The protective layer may be applied, for example, to protect a surface of the optical interface which is exposed to the environment. However, this also suffers from the problem that the hard material may increase reflectance (and thus decreases transmittance) both at the air-protective layer interface, and at the protective layer-soft material interface. Furthermore, when such a hard layer is applied on a softer material (e.g. on glass), the abrasion resistance may not be significantly improved as the hard layer can crack upon scratching due to being inadequately supported by the softer material.

Patterned layers have been shown to improve (i.e. decrease) reflectance. In particular, such patterned layers can be nanostructured (i.e. are formed of features with dimensions in the region of hundreds of nanometers or less) such that their reflectance can be decreased to, for instance, less than 1% per interface. This decreased reflectance is due to the nanostructured layer comprising both the material of which the features are formed, and air interposed between the features; the air assisting to decrease an overall refractive index of the patterned layer such that reflectance at the air-patterned layer interface may be decreased. However, such nanostructured layers tend to be fragile such that they are susceptible to damage. Such layers can also be polluted by, for example, skin residues which may become interposed between the nano-sized features, to the detriment of the optical properties of the patterned layer.

SUMMARY OF THE INVENTION

The present invention seeks to provide a laminate comprising an abrasion resisting layer disposed on a surface of an optically transmissive substrate, the layer being more robust and less susceptible to pollutants than conventional patterned layers.

The present invention further seeks to provide a device comprising the laminate.

The present invention yet further seeks to provide a method of manufacturing the laminate.

The invention is defined by the independent claims. The dependent claims provide advantageous embodiments.

According to an aspect, there is provided a laminate comprising an abrasion resisting layer disposed on a surface of an optically transmissive substrate, wherein the layer comprises a pattern of spatially separated protrusions of a material extending away from the surface, and silica interposed between the protrusions, wherein the material has a Knoop hardness measured according to ASTM E384 Knoop Hardness Standard which is greater than that of the silica.

The present invention is based on the realisation that a layer comprising a pattern of spatially separated protrusions of a material may exhibit good abrasion resisting properties and robustness, providing silica is interposed between the protrusions and the material has a Knoop hardness which is greater than that of the silica.

The effect of the silica and the material having a Knoop hardness greater than that of the silica is that the layer may be sufficiently hard to withstand abrasion from, for example, sand (which may include silica in the form of quartz). As well as the silica contributing to the hardness of the layer, the silica being interposed between the protrusions may render the layer more mechanically robust in comparison to, for example, patterned layers in which only air is interposed between protrusions. The presence of the silica also may assist to limit or prevent pollution of the layer by other materials which may otherwise collect between the protrusions and cause marks/stains to appear on the laminate.

In terms of the anti-reflectance properties of the layer, the silica further reduces an overall refractive index of the layer relative to, for example, an unpatterned layer consisting entirely of the material. This is because the refractive index of the silica will tend to be lower than that of the material (since the material is harder than silica and the greater hardness of the material may coincide with it having a higher refractive index). This lowering of the overall refractive index of the layer may result in lower reflectance at an air-layer interface (since the overall refractive index of the layer is lowered by the silica such that it is closer to that of air). For scenarios in which the substrate has a lower refractive index than the material, the presence of the silica and concomitant lowering of the overall refractive index of the layer (i.e. such that it more closely approaches the refractive index of the substrate) may further reduce reflectance at a layer-substrate interface.

The protrusions may comprise extremities which align with an exposed surface of the silica opposing the surface, or protrude from the exposed surface.

In embodiments wherein the extremities of the protrusions are aligned with the exposed surface of the silica, the mechanical robustness of the layer and the ability of the layer to exclude any pollutant material which may collect between the protrusions may be enhanced.

On the other hand, a layer in which the protrusions protrude from the exposed surface may be beneficial in terms of the anti-reflectance properties of the layer. In such embodiments, air may be interposed between portions of the protrusions which protrude from the exposed surface. Thus air may interpose the protrusions between the exposed surface and the extremities, and the silica may interpose the protrusions between the surface and the exposed surface. Accounting for the air in the layer, a more gradual refractive index change of the interface with air of such a layer may therefore be achieved relative to, for example, a layer in which the extremities are aligned with the exposed surface such that only the silica may be interposed between the protrusions (since plainly the refractive index of air is less than that of the silica). This more gradual refractive index change of the layer may result in improved anti-reflectance behavior, whilst maintaining good scratch resistance properties of the exposed surface of the layer. This is because impact of a hard object, e.g a grain of sand, a metal objects such as a key, or the like, will cause an elastic deformation of the protrusions protruding from the exposed layer surface, thereby protecting the silica portions in between such protrusions from damage by such hard objects.

The protrusions may taper in a direction away from the surface of the substrate.

Tapering protrusions may be used to tailor the properties of the layer at its respective interfaces. Specifically, at the layer-substrate interface, the total area covered by the protrusions may be chosen such that the effective refractive index of the layer at this interface (closely) matches the refractive index of the substrate in order to achieve low reflectance at this interface, whereas the area of such harder materials, which typically have a high refractive index as previously explained, may be reduced at the layer-air interface to minimize reflectance at this interface.

The protrusions may, in embodiments wherein the protrusions are tapered, be truncated.

Truncation of the tapered protrusions may enhance the abrasion resisting/robustness properties of the layer.

The tapering may be such that a smallest width of the truncated protrusion may be between 5% and 60% of a largest width of the protrusion.

When the tapering is such that the smallest width is between 5% and 60% of the largest width, the layer may exhibit both low reflectance and good mechanical robustness.

The protrusions may comprise at least one of a cone-shape, a truncated cone shape, a hyperboloid shape, a pyramid shape, a truncated pyramid shape, a dome shape, and a truncated dome shape.

The material may comprise one or more selected from sapphire, silicon nitride, cubic boron nitride, and diamond.

Such materials may exhibit high Knoop hardnesses and may be highly optically transmissive (e.g. for visible light wavelengths).

The substrate may comprise a material contacting the layer having a relatively high Knoop hardness, i.e. a Knoop hardness higher than silica. Examples of such substrate materials include sapphire and diamond. Such materials may be deployed as stand-alone substrate materials or as substrate materials as part of the laminate substrate, e.g. a layered substrate including a glass layer and such a substrate material in between the glass layer and the anti-reflective layer according to embodiments of the present invention. Such hard substrate materials are becoming increasingly popular to improve the anti-scratch properties of the substrate but suffer from unfavourable reflectivity as previously explained.

A period of the pattern may range from 10 to 350 nm.

A period of the pattern being lower than 350 nm may assist in limiting or preventing interference phenomena of visible light, such as diffraction, thus enhancing the suitability of the layer for protecting a surface of visible light-transmissive substrates. The period being greater than 10 nm may ensure good (i.e. low) reflectance properties and mechanical robustness.

A height of the protrusions may range from 50 to 500 nm.

A height in this range may assist to enhance the anti-reflectance properties of the layer.

The layer may comprise a first region and a second region; the first region having a first pattern and the second region having a second pattern which is different from the first pattern such that the first region and the second region have different refractive indices relative to each other and/or have different optical interference properties relative to each other.

The different refractive indices and/or optical interference properties of the respective first and second regions may permit the regions to be distinguishable, for example to the naked eye. As such, the contrast between the regions may be used to provide a motif, for example a logo, an anti-counterfeiting (e.g. 'hologram'-type) mark, decorative effect etc.

The first pattern and the second pattern may comprise differently shaped protrusions relative to each other.

The shape of the protrusions may influence the reflectance (and thus the transmittance) of the layer. The shape may further influence the reflectance as a function of wavelength. Accordingly, the respective regions may be distinguishable, for example to the naked eye, in terms of the intensity and/or the spectral composition (i.e. colour) of the light reflected from (or transmitted through) the respective regions.

In accordance with another aspect, there is provided a device comprising an optically transmissive component comprising the laminate of any of the herein embodiments. The device may, for example, be a mobile phone, tablet computer, wristwatch, camera, a window etc.

The optically transmissive component may be a window pane or a screen.

The window pane may, for example, be a toughened or armoured glass window pane; the screen may, for example, be a touch screen, a display screen such as of a liquid crystal display, a watch face etc.

In accordance with another aspect, there is provided a method of manufacturing a laminate comprising an abrasion resisting layer disposed on a surface of an optically transmissive substrate, the method comprising: providing a layer of a material on the surface; structuring the layer to form a pattern of spatially separated protrusions extending away from the surface; applying silica to the pattern such that the silica is interposed between the protrusions; wherein the material has a Knoop hardness measured according to ASTM E384 Knoop Hardness Standard which is greater than that of the silica.

It is noted for the avoidance of doubt that the providing a layer may not necessarily involve providing a layer comprising a different material compared to that of the substrate. In embodiments wherein, for example, the substrate and the material may both have the same composition, the providing a layer may merely refer to a surface layer of the substrate.

The structuring may comprise: providing a patterned etch mask on the layer, the mask being patterned such that it covers portions of the layer and leaves further portions uncovered; and selectively etching the layer using the patterned etch mask such that the further portions are at least partially removed, thereby forming the pattern.

The providing a patterned etch mask may comprise: providing a pattern precursor layer on the layer; imprinting the pattern precursor layer with a patterned stamp; developing the pattern precursor layer into the patterned etch mask; and removing the patterned stamp from the patterned etch mask.

The applying may comprise: depositing the silica such that it immerses the pattern; partially removing the silica such that extremities of the protrusions align with an exposed surface of the silica opposing the surface, or protrude from the exposed surface.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
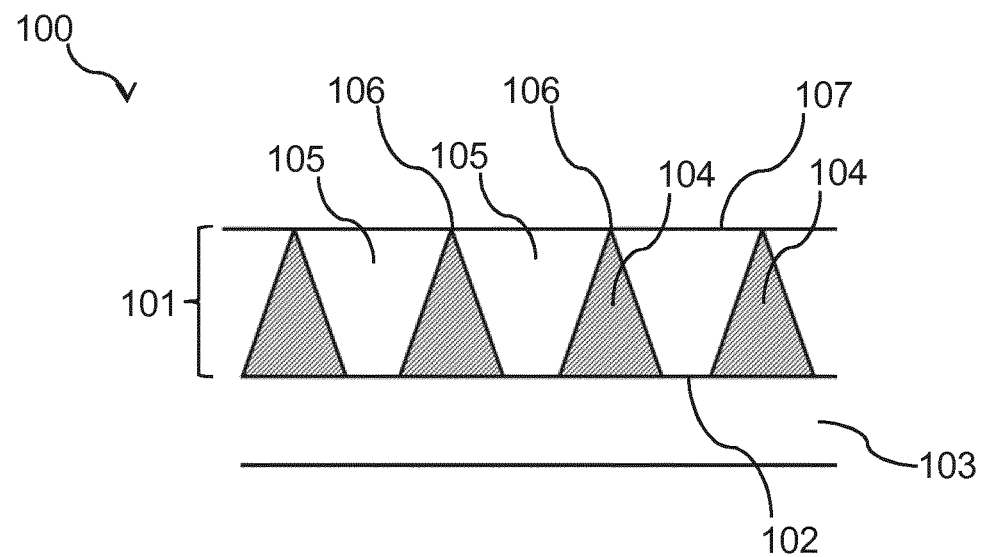
FIG. 1 schematically depicts a cross-section of a laminate according to an embodiment of the present invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts, unless otherwise stated.

The refractive indices quoted herein are based on a light wavelength of 589 nm unless otherwise stated. This should, however, not be interpreted as limiting the scope of the invention to visible light-transmissive laminates.

The Knoop hardness is measured according to ASTM E384 Knoop Hardness Standard unless otherwise stated.

In addition, where reference is made to an abrasion or scratch resistance of the abrasion resisting layers of the present invention, it should be understood that such abrasion or scratch resistance may be tested using any suitable testing technique, e.g. using a suitably sized diamond indenter. By way of non-limiting example, such abrasion resistance may be tested using the ASTM G171-03 standard test method for scratch hardness of materials using a diamond stylus on a micro-tribometer but it should be understood that many other test methods for determining the scratch hardness are readily available to the skilled person.

A period of the pattern may be defined as an average distance between centres of nearest-neighbour protrusions in the pattern.

The present invention is based on the realisation that a layer comprising a pattern of spatially separated protrusions of a material may exhibit good reflectance properties combined with good abrasion resisting properties and robustness, providing silica is interposed between the protrusions and the material has a Knoop hardness which is greater than that of the silica.

FIG. 1 schematically depicts a cross-section of a laminate 100 comprising such a layer 101 disposed on a surface 102 of an optically transmissive substrate 103. The layer 101 may comprise a pattern of spatially separated protrusions 104 of a material; the protrusions 104 extending away from the surface 102. The silica 105 may be interposed between the spatially separated protrusions 104; an exposed surface 107 of the silica 105 may oppose the surface 102.

The silica 105 may, for example, have a relatively high Knoop hardness of 800 to 900 $g_F \cdot mm^{-2}$, and a refractive index of ca. 1.45. The silica 105 may, for example, comprise amorphous and/or crystalline forms of silicon oxide. If present, the crystalline form(s) may, for example, include quartz.

In an embodiment, the material may comprise one or more selected from sapphire, silicon nitride, cubic boron nitride, and diamond. Such materials possess a Knoop hardness which is greater than that of the silica 105. It is also noted that these materials each have a higher refractive index than the silica 105.

Regarding the abrasion resistance of the layer 101, the material having a Knoop hardness ($HK_m$) which is greater than that of the silica 105 ($HK_{sil}$) may ensure that an effective (i.e. overall) Knoop hardness of the layer 101 ($HK_{eff}$) is sufficiently high such that the layer 101 may resist abrasion by silica (e.g. sand). For example, $HK_{eff}$ may range from 1000 to 5000 $g_F \cdot mm^{-2}$, such as from 1000 to 2000 $g_F \cdot mm^{-2}$. The effective Knoop hardness ($HK_{eff}$) of the layer 101 at the exposed surface 107, i.e. the layer-air interface, may be defined by Equation 1.

$$HK_{eff} = A_m \cdot HK_m + A_{sil} \cdot HK_{sil} \quad \text{(Equation 1)}$$

wherein $A_m$ is defined by: (a projected area of the material on the surface 106)/(a total area of the surface 106); and $A_{sil}$ is defined by: (a projected area of the silica 105 on an outer surface of the layer 101 opposing the surface 102)/(a total area of the outer surface).

By varying one or more of $HK_m$, $A_m$ and $A_{sil}$, the $HK_{eff}$ may be tuned according to, for example, the intended application of the laminate 100. For example, suitable values for $HK_m$ may range from 1500 to 8000 $g_F \cdot mm^{-2}$. It is further noted that $HK_{sil}$ may also be varied by adjusting certain features of the silica 105, for example the density of the silica 105.

In this way, the $HK_{eff}$ may, for example, be adjusted such that it is high enough to withstand abrasion from, for example silica (e.g. sand). Depending on the intended application, the $HK_{eff}$ may, for example, be sufficiently high such that the laminate 100 is resistant to abrasion by materials which may be harder than silica, whilst at the same time tailoring the reflective properties of the exposed surface layer 107, i.e. minimizing reflectance as will be explained in more detail below.

The interposing of the silica 105 between the protrusions 104 may further render the layer 101 more mechanically robust in comparison to, for example, patterned layers in which only air is interposed between protrusions. The silica 105 may further serve to introduce a compressive stress in the layer 101. This may, for example, derive from interposing the silica 105 between the protrusions 104 at elevated temperatures; the coefficient of thermal expansion of the silica 105 (0.5 ppm/K) may be lower than, for example, that of the substrate 103 such that cooling which may follow the interposing may result in the substrate 103 contracting to a greater degree than the silica 105. The resulting compressive stress may render the layer 101 more robust such that it is, for example, more resistant to cracking. This may also assist the abrasion resistance of the layer 101 since the compressive stress may serve to decrease an applied tensile stress such that the layer 101 may better resist mechanical stresses exerted during abrasion. Moreover, the presence of the silica 105 may assist to limit or prevent pollution of the layer 101 by other materials which may otherwise collect between the protrusions 104 and cause marks/stains to appear on the laminate 100.

Regarding the optical properties of the layer 101, it is known that a higher hardness of a material tends to coincide with a higher refractive index. Accordingly, the optical role of the silica 105 in the layer 101 is to decrease an overall refractive index ($n_{eff}$) of the layer 101. More specifically, as will be explained in more detail below, the total area fraction of silica at the layer air interface 107 and the layer substrate interface 102 may be respectively tuned to achieve the desired optical properties at these respective interfaces. At this point, it is noted that the normal incidence reflectance (R) at a medium-layer interface depends on the refractive index of the layer 101 ($n_{eff}$) and the refractive index of the medium ($n_{med}$) in contact with layer 101 (e.g. air). The expression is provided in Equation 2.

$$R = [(n_{eff} - n_{med})/(n_{eff} + n_{med})]^2 \quad \text{(Equation 2)}$$

Considering Equation 2, it can be straightforwardly appreciated that a greater difference between $n_{eff}$ and $n_{med}$ will result in a higher reflectance at a medium-layer interface. Accordingly, the effect of the silica 105 in terms of lowering the overall refractive index ($n_{eff}$) of the layer 101 may result in lower reflectance at an air-layer interface 107. This, of course, assumes that the medium (e.g. air; $n_{med} = 1.00$) has a lower refractive index than the layer 101, which may generally be the case for gaseous media.

Similarly, in embodiments in which the substrate 103 may have a lower refractive index than the material, the presence of the silica 105 and concomitant lowering of the overall refractive index of the layer 101 (i.e. such that it more closely approaches the refractive index of the substrate 103) may further reduce reflectance at a layer-substrate interface. Thus the layer 101 may decrease reflectance at both the air-layer and layer-substrate interfaces.

The substrate 103 may, for instance, have a higher Knoop hardness than silica. For example, the substrate 13 may consist of materials such as sapphire, diamond or alternatively may include a surface layer of such materials in contact with the layer 101 such that the substrate has desirable hardness (abrasion resistance) properties. However, as previously explained, the greater hardnesses of such substrates 103 (e.g. sapphire) may coincide with higher refractive indices, and thus poorer anti-reflectance properties (e.g. compared with glass). Accordingly, for a laminate 100 comprising such hard substrates 103, the layer 101 may improve the anti-reflectance properties of the laminate 100. The layer 101 may also be hard, mechanically robust, and may assist to exclude pollutants as previously described.

In the embodiment shown in FIG. 1, the protrusions 104 may taper in a direction away from the surface 102. This has the advantage that the optical properties of the layer 101 at the layer-substrate interface 102 may be (closely) matched to the optical properties of the substrate 103, in particular matching of the effective refractive index of the layer 101 at this interface to the refractive index of the substrate 103. For example, in an embodiment where the substrate 103 comprises the same material as employed as the material of the layer 101, the surface of the layer 101 at the layer-substrate interface 102 may be entirely formed of the protrusions 104, i.e. the protrusions 104 contact each other at this interface such that the effective refractive index of the layer 101 at the interface 102 equals the refractive index of the substrate 103, thereby minimizing reflections at this interface. As will be readily understood by the skilled person, the total area of the surface of the layer 101 at the layer-substrate interface 102 defined by the protrusions 104 may be tuned to minimize a difference between the effective refractive index of the layer 101 at this interface and the refractive index of the substrate 103. In other words, by tuning the total area of the protrusions 104 and the silica portions 105 at the interface 102, the effective refractive index of the layer 101 may be tuned to closely match, e.g. to minimize a difference with, the refractive index of the substrate 103.

At the same time, such refractive index matching is also desirable at the layer-air interface 107 to minimize reflections at this interface. Obviously, the refractive index of air is much lower than the refractive index of the substrate 103, such that in order to minimize the difference between the refractive index of air and the effective refractive index of the layer 101 at the interface 107, the total area of the exposed surface of the layer 101 defined by the protrusions 104 preferably is minimized to such an extent that the difference in refractive index between the exposed surface of the layer 101 and air is minimized whilst retaining the abrasion resistance properties of the exposed surface of the layer 101, which may be achieved by controlling the degree of tapering of the protrusions 104 as will be readily understood by the skilled person.

Hence, tapering protrusions 104 may result in enhanced anti-reflectance properties of the layer 101. The tapering typically is in a direction away from the surface 102 such that the layer 101 may have progressively more of the material (and less of the silica 105) closer to the surface 102 of the substrate 103. As the amount of the material decreases further from the surface 102, an amount of the silica 105 interposing the protrusions 104 may progressively increase. It is once again noted that the material has a greater (Knoop) hardness than the silica 105 such that the material will tend to have a higher refractive index than the silica 105. Hence the tapering results in a layer 101 in which the refractive index progressively increases towards the surface 102 of the substrate 103 for the reasons explained above.

In an embodiment, the (tapered) protrusions 104 may comprise cone-shape, a truncated cone shape, a hyperboloid shape, a pyramid shape, a truncated pyramid shape, a dome shape, and a truncated dome shape.

In alternative non-limiting examples, the protrusions 104 may not be tapered; such non-tapered protrusions 104 comprising, for example, cylindrical or polygonal, e.g. cuboidal, shapes. In such embodiments, the layer 101 may have a relatively uniform refractive index in a direction from the surface 102 to the extremities 106. The non-tapered shape of the protrusions 104 may, however, lead layers 101 comprising such protrusions 104 displaying different profiles of reflectance as a function of wavelength of incident light and/or angle of incidence with respect to layers 101 comprising tapered protrusions 104. Furthermore, non-tapered protrusions 104 may enhance, for instance, the abrasion resistance at the extremities 106 (i.e. since an absence of tapering may lead to greater amounts of the material being present at the extremities 106).

Figure 2:
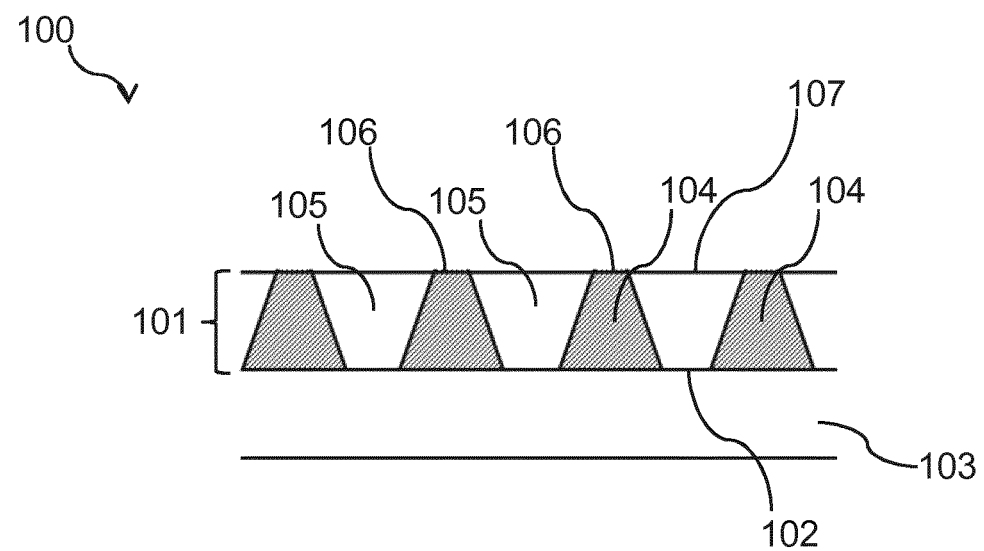
FIG. 2 schematically depicts a cross-section of a laminate according to another embodiment of the present invention.

FIG. 2 schematically depicts a cross-section of a laminate 100 according to an embodiment in which the protrusions 104 may be truncated. Truncation of the tapered protrusions 104 may limit a degree to which the protrusions 104 become narrower closer to the extremities 106, thereby limiting the decrease in an amount of the material (having a greater Knoop hardness than the silica 105) further from the surface 102. Accordingly, truncated protrusions 104 may limit a degree to which the layer 101 becomes softer further from the surface 102, thereby enhancing the abrasion resisting properties of the layer 101. The degree of truncation may be selected based on the desired refractive index properties at the layer-air interface 107 (i.e. the exposed surface) as will be readily understood by the skilled person from the foregoing.

It may be observed from FIGS. 1 and 2 that the extremities 106 of the protrusions 104 may align with an exposed surface 107 of the silica 105. In such embodiments, the mechanical robustness of the layer 101 may be enhanced due to the silica 105 in the layer 101 extending to the extremities 106 of the protrusions 104. Furthermore, the ability of the layer 101 to exclude any pollutant material which may collect between the protrusions 104 may be enhanced.

Figure 3:
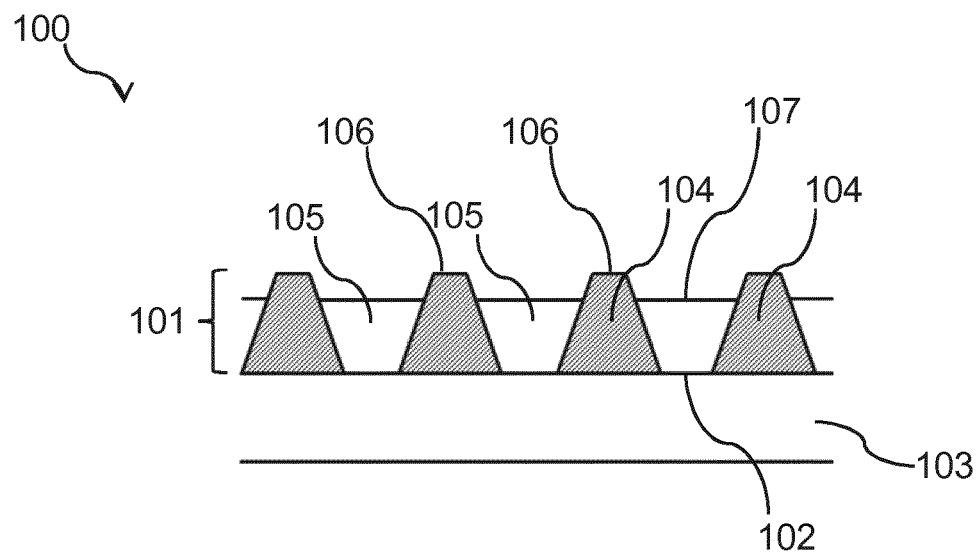
FIG. 3 schematically depicts a cross-section of a laminate according to still another embodiment of the present invention.

On the other hand, FIG. 3 schematically depicts a cross-section of a laminate 100 in which the protrusions 104 protrude from the exposed surface 107, for example by an amount of 2-20 nm, more preferably 5-10 nm. Such protrusions 104 protruding from the exposed surface 107 by way of non-limiting example may be obtained by polishing the exposed surface 107, e.g. using mechanical polishing, chemical mechanical polishing or the like, in order to planarize the exposed surface 107, during which polishing part of the silica portions 105 may be eroded away from between the protrusions 104 of the hard material. Such a layer 101 may possess improved anti-reflectance properties relative to layers 101 in which the extremities 106 align with the exposed surface 107. This may be understood by the more gradual change in the effective refractive index of the layer 101 in FIG. 3, which in essence defines a two-layer system comprising a first layer defined by the upper part of the protrusions 104 in which air is present between the protrusions and a second layer in between the first layer and the substrate 103 in which silica 105 is present in between the protrusions 104. Consequently, the first layer has an effective refractive index more closely matching that of air compared to a first layer in which the air portions in between the extremities of the protrusions 104 are replaced by silica portions 105, thereby potentially providing the layer 101 with improved anti-reflectance behavior since the effective refractive index of the layer 101 at the layer-air interface may more closely match the refractive index of air.

In embodiments wherein the protrusions 104 protrude from the exposed surface 107, the portions which protrude from the exposed surface 107 may, for example, have an aspect ratio of below 0.5 such that the extremities 106 are not located too far from the exposed surface 107. In this way, any decrease in mechanical robustness and less effective pollutant exclusion resulting from the protrusions 104 protruding from the exposed surface 107 may be mitigated. Specifically, upon being impacted with a hard object such as a grain of sand or metal object, e.g. a key, the extremities of the protrusions 104 may elastically deform, thereby at least partially sealing the air-filled gaps between the protrusions such that the lower-lying portions of silica 105 are subsequently also contacted by the object at which point the effective pressure on the protrusions 106 decreases and the effective hardness increases due to the combination of 106 and 105 and avoids damage to the layer 101. At this point, it is noted that the optical properties of the layer 101 may be further controlled by control over the periodicity of the protrusion 104 and the thickness of the layer 101. For example, by selecting a periodicity relative to the effective wavelength of the light incident on the layer 101, diffractive properties of the layer 101 may be controlled, whereas selecting a thickness of the layer 101 relative to the effective wavelength of the light incident on the layer 101, interference properties of the layer 101 may be controlled as will be readily understood by a person skilled in the art.

Figure 4:
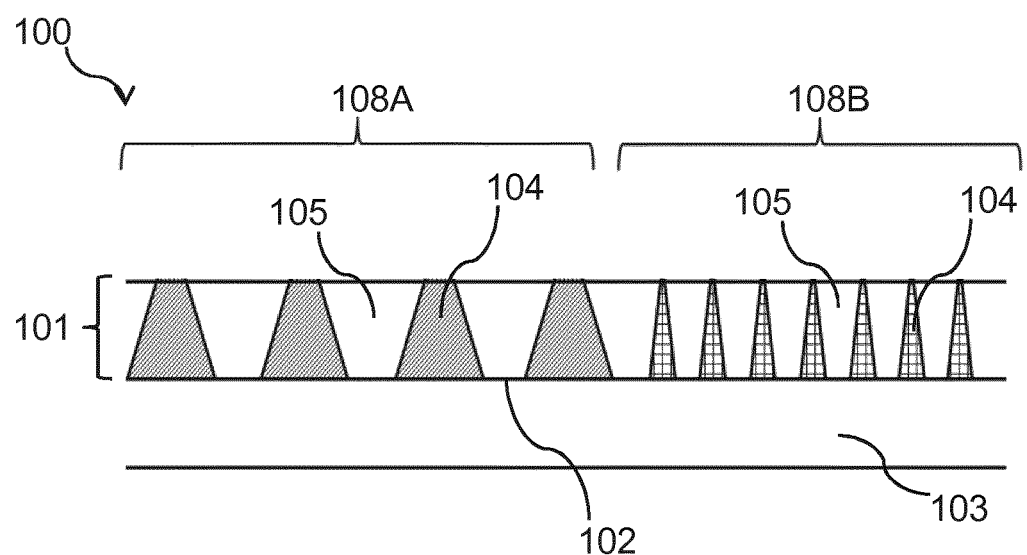
FIG. 4 schematically depicts a cross-section of a laminate according to yet another embodiment of the present invention.

FIG. 4 schematically depicts an embodiment wherein the layer 101 may comprise a first region 108A and a second region 108B; the first region 108A having a first pattern and the second region 108B having a second pattern which is different from the first pattern. The nature of the pattern including, for example, a period of the pattern, the dimensions of the protrusions 104, and the shape of the protrusions 104, and a degree to which the silica 105 fills a space interposed between the protrusions 104 (as previously discussed) etc., may influence the optical properties of the layer 101. In such an embodiment wherein the layer 101 comprises a first region 108A and a second region 108B which have different patterns relative to each other, the differences in the patterns may result in the two regions 108A/B being distinguishable with respect to each other due to their differing refractive indices and/or optical interference properties. For example, the difference in reflectance of the two regions 108A/B may be discerned, for example, with the naked eye. Alternatively or additionally, the period of the respective patterns may be different such that, for example, one region has a greater diffractive effect on visible light than the other region. In this way, the regions 108A/B may exhibit different diffraction colours/layer interference colours relative to each other. Such a difference in interference behaviour may also be discerned, for example, with the naked eye.

In an embodiment, the first pattern and the second pattern may comprise differently shaped protrusions 104 relative to each other. The shape of the protrusions 104 may partly determine the refractive index of the regions 108A/B or layer 101, thereby influencing the reflectance (and thus the transmittance) of the regions 108A/B or layer 101. The shape of the protrusions 104 may further influence the reflectance of the layer 101 as a function of wavelength. Accordingly, providing a laminate 100 with different regions 108A/B may result in the respective regions 108A/B being distinguishable, for example to the naked eye, in terms of the intensity and/or the spectral composition (i.e. colour) of the light reflected from (or transmitted through) the respective regions 108A/B.

These effects may, for example, be used to fashion a motif using the contrast provided by the two regions 108A/B. The motif may be used, for example, to provide a logo, anti-counterfeiting (e.g. 'hologram'-type) mark, decorative effect etc. In a non-limiting example, a more complex motif may be fashioned by using more than two regions (i.e. more than two patterns).

Figure 19:
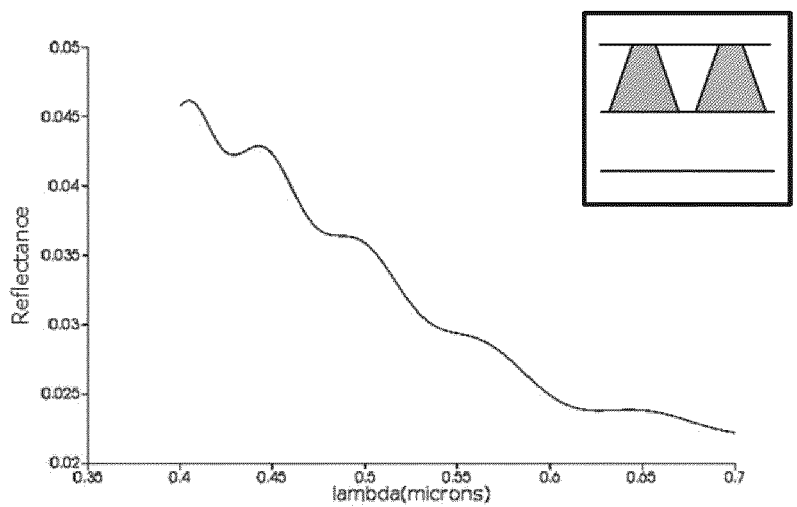
FIGS. 18-20 depict simulated plots of reflectance vs. wavelength for layers according to embodiments of the present invention.
Figure 20:
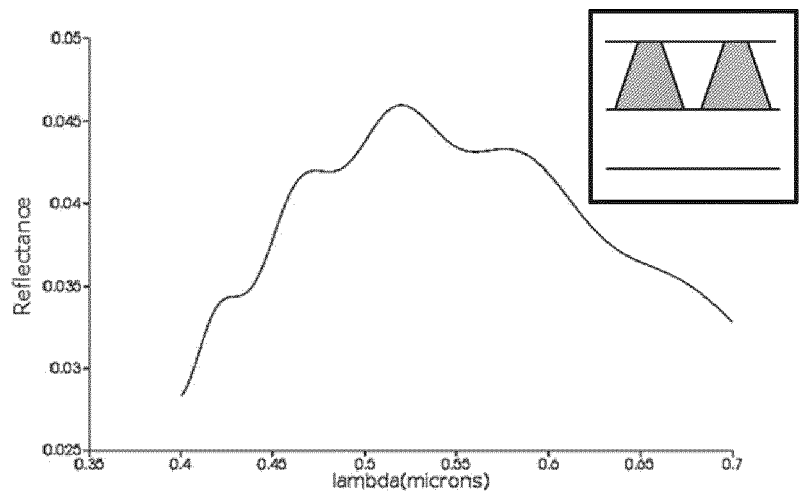
Figure 18:
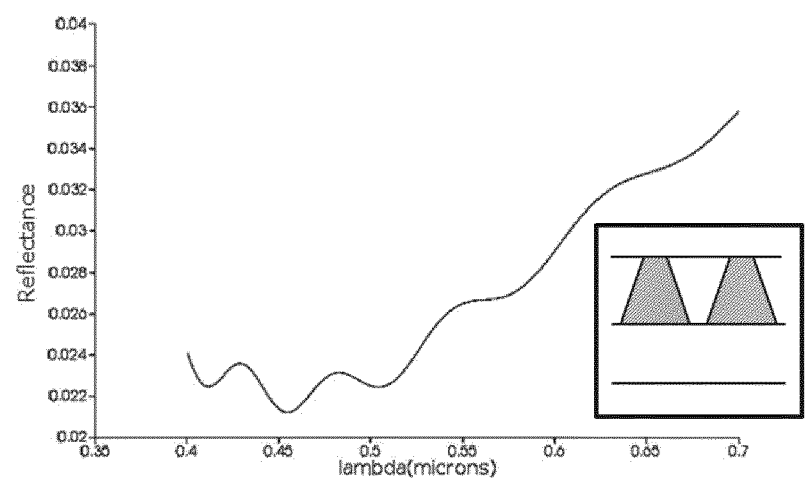

The influence of both the shape and dimensions of the protrusions 104 will now be described in more detail with reference to FIGS. 5A/B, 6A/B, 7-20 which depict simulated plots of transmittance or reflectance vs. wavelength for patterns on a substrate 103 (FIGS. 5A/B, 6A/B, 7-17), and laminates 100 (i.e. comprising layers 101 comprising the silica 105; FIGS. 18-20). The simulated plots were constructed using finite time domain electromagnetic simulations (FDTD). Similar techniques may be used to determine the reflectance/transmittance of the patterns or layers 101 as a function of angle of incidence but these are not presented herein. The calculations employ air as the medium outside the pattern/layer 101; in these non-limiting examples, the material is sapphire (n=1.78) and the substrate 103 is a sapphire substrate. The patterns have been calculated with air being interposed between the protrusions 104; the layers 101 (FIGS. 18-20) have been calculated with the silica 105 interposing the protrusions 104; the extremities 106 aligning with the exposed surface 107 in these particular non-limiting examples.

Figure 5A:
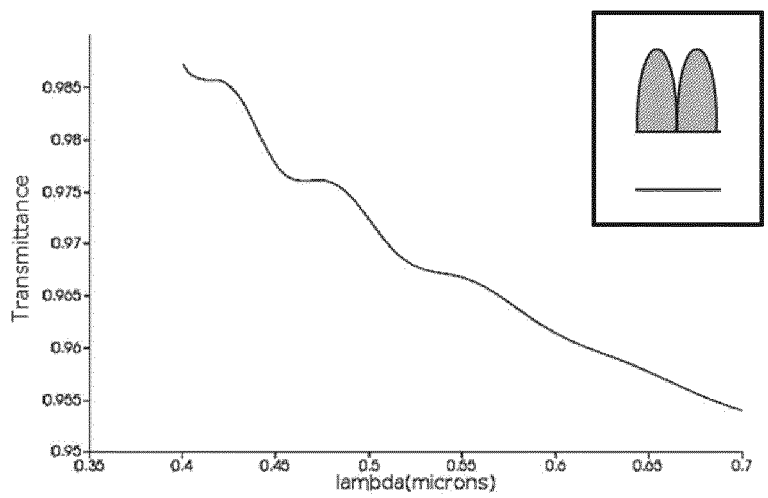
FIG. 5A depicts a simulated plot of transmittance vs. wavelength for a pattern according to an embodiment of the present invention.
Figure 5B:
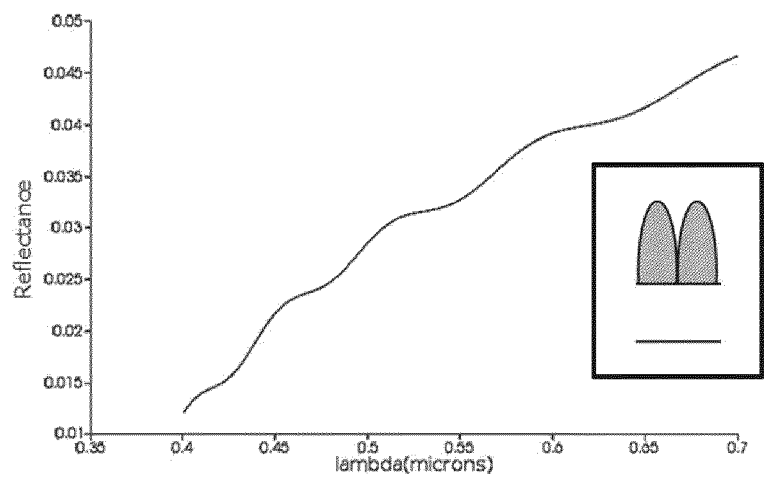
FIG. 5B depicts a simulated plot of reflectance vs. wavelength for the same pattern as in FIG. 5A.

FIG. 5A and FIG. 5B respectively provide transmittance vs. wavelength and reflectance vs. wavelength plots for a non-limiting example of a pattern comprising dome-shaped protrusions 104 (see inset of FIG. 5A/B). The period of the pattern is 200 nm and a height of the protrusions 104 from the surface 102 is 170 nm. The transmittance of the pattern generally decreases with wavelength from ca. 0.985 (98.5%; 400 nm) to ca. 0.955 (95.5%; 700 nm). As may be expected, the reflectance of the pattern generally increases with wavelength from ca. 0.015 (1.5%; 400 nm) to ca. 0.045 (4.5%; 700 nm).

Figure 6A:
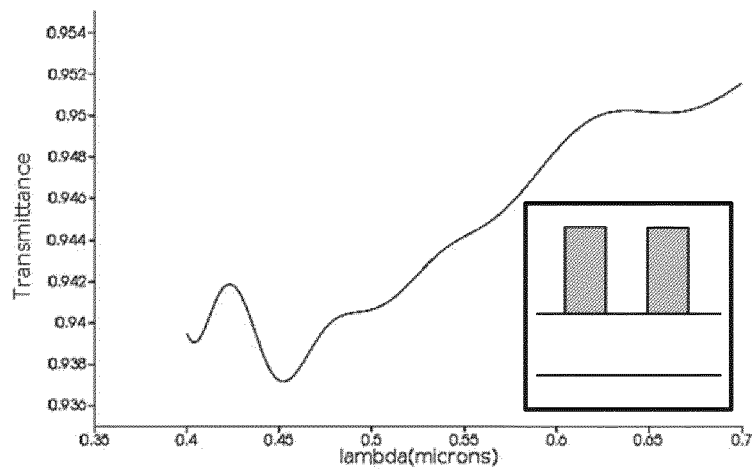
FIG. 6A depicts a simulated plot of transmittance vs. wavelength for a pattern according to another embodiment of the present invention.
Figure 6B:
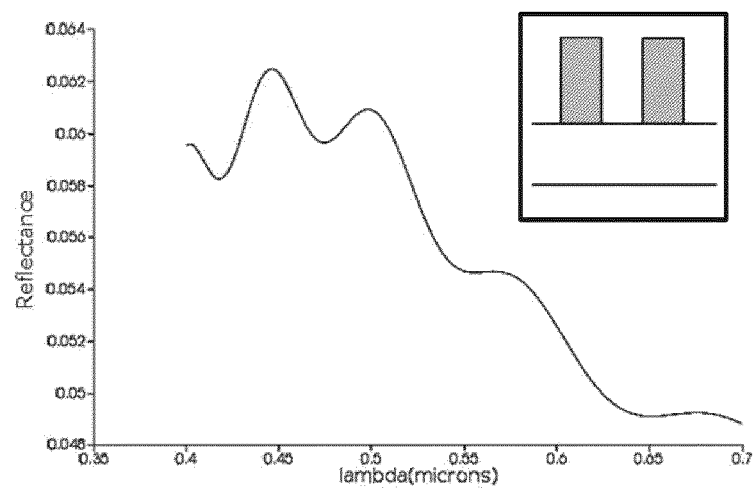
FIG. 6B depicts a simulated plot of reflectance vs. wavelength for the same pattern as in FIG. 6A.
Figure 7:
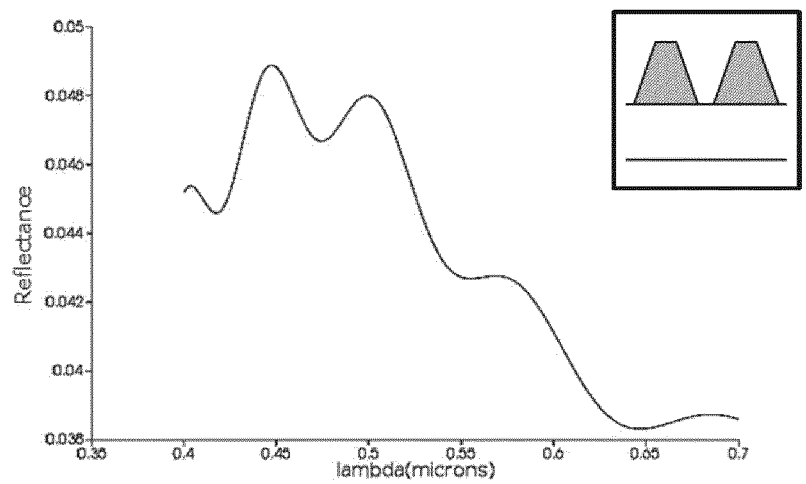
FIGS. 7-10 depict simulated plots of reflectance vs. wavelength for patterns comprising tapered protrusions according to embodiments of the present invention.
Figure 8:
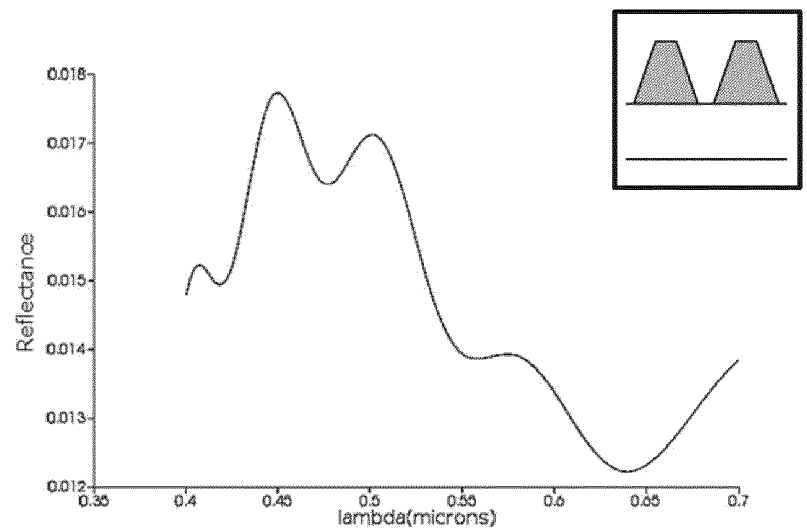
Figure 9:
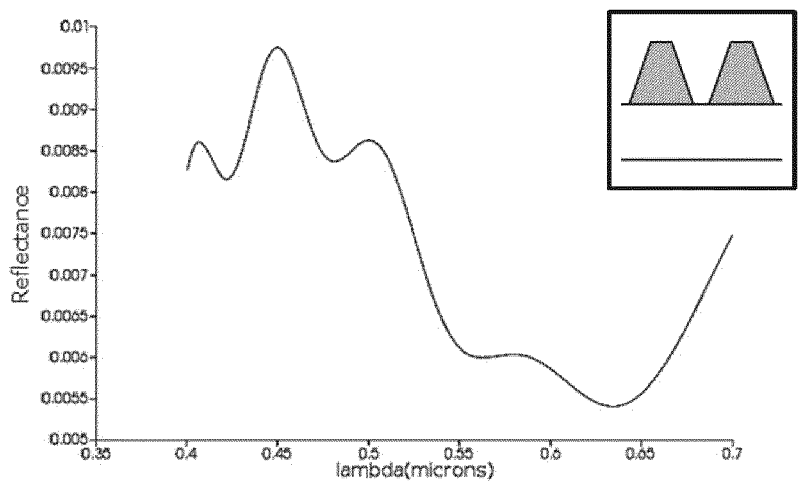

This may be compared to FIG. 6A and FIG. 6B which respectively provide transmittance vs. wavelength and reflectance vs. wavelength plots for a pattern comprising cuboidal protrusions 104 (see inset of FIG. 6A/B). The period of the pattern in this non-limiting example is also 200 nm and the width of the protrusions 104 is 50 nm. In contrast to the case in FIG. 5A/B, the transmittance of the pattern of FIG. 6A/B may generally increase with wavelength (albeit less steadily than in FIG. 5A/B). The increase is from ca. 0.94 (94%; 400 nm) to ca. 0.955 (95.5%; 700 nm). As may be expected, the reflectance of the pattern correspondingly decreases with wavelength from ca. 0.06 (6%; 400 nm) to ca. 0.045 (4.5%; 700 nm). Thus comparing the patterns of FIGS. 5A/B and 6A/B, the tapering protrusions 104 may result in lower reflectance (as previously described). Moreover, the simulations indicate that variation of the reflectance as a function of wavelength may depend (at least partly) on the shape of the protrusions 104. This demonstrates that the differently shaped protrusions 104 may permit tuning of intensity and spectral composition of light reflected from (or transmitted through) the layer 101. For the non-limiting examples simulated in FIGS. 5A/B and 6A/B, the former pattern may reflect a greater proportion longer wavelengths of light (i.e. towards the red region of the spectrum) while the latter may reflect a greater proportion of shorter wavelengths (i.e. towards the blue region of the spectrum). The spectral composition (i.e. colour) of the reflected hues from these patterns may therefore appear different relative to each other. This further demonstrates that the two regions 108A/B (e.g. as depicted in FIG. 4) respectively comprising differently shaped protrusions 104 relative to each other, may be distinguished with respect to one another in terms of the spectral composition of light reflected from (or transmitted through) the respective regions 108A/B, as well as by the intensity of the reflected (or transmitted) light.

Figure 10:
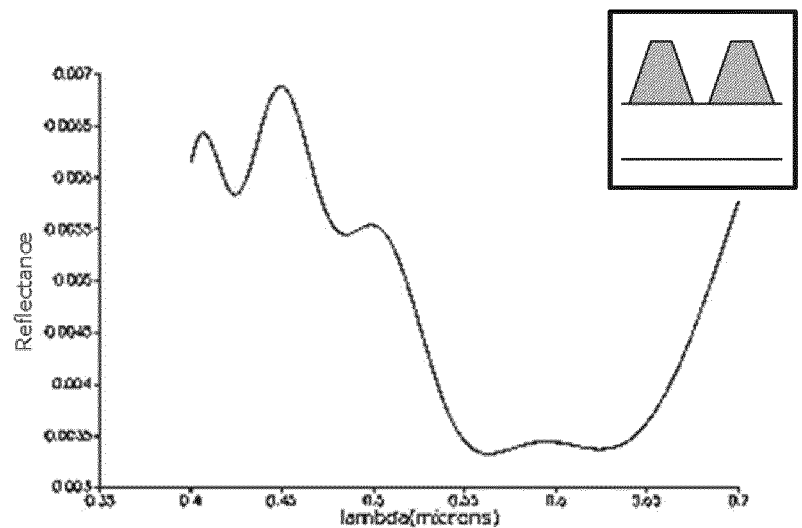
Figure 11:
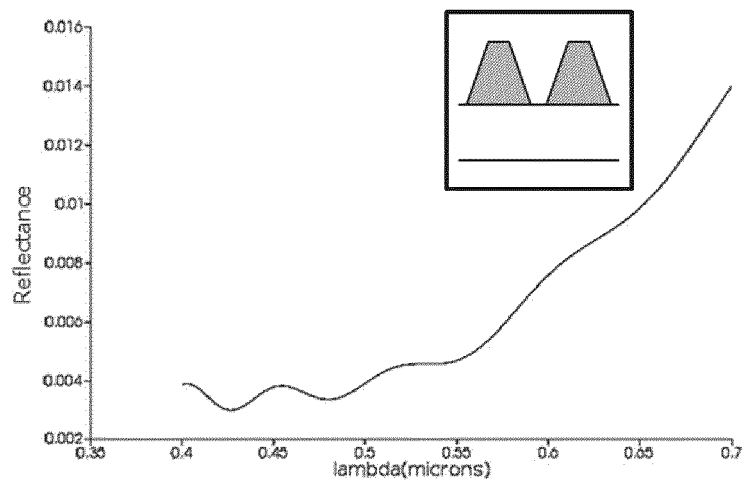
FIGS. 11-14 depict simulated plots of reflectance vs. wavelength for patterns comprising tapered protrusions according to further embodiments of the present invention.
Figure 12:
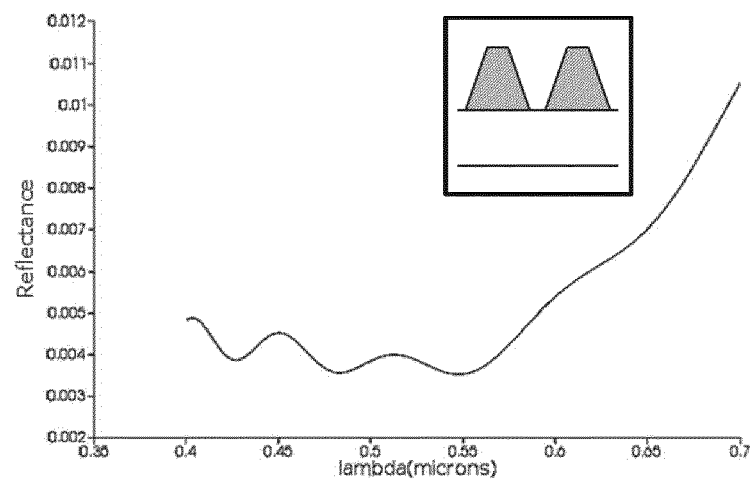
Figure 13:
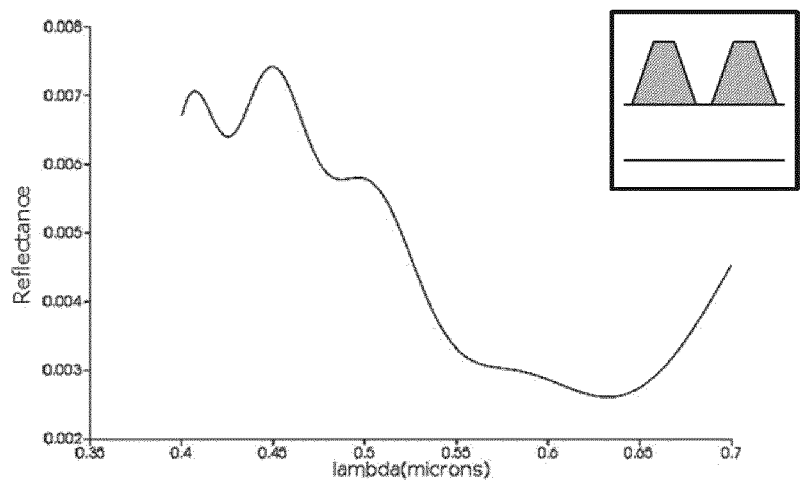

FIGS. 7-10 provide reflectance vs. wavelength plots for non-limiting examples of patterns comprising truncated pyramidal protrusions 104 (see inset of FIGS. 7-10). These patterns all have a period of 200 nm, a height of the protrusions 104 of 200 nm, and a smallest width of the protrusions 104 of 50 nm. These patterns differ in terms of the largest width of the protrusions 104: 100 nm (FIG. 7), 150 nm (FIG. 8), 170 nm (FIG. 9), 180 nm (FIG. 10). Thus the smallest width in these non-limiting examples varies from ca. 15% to ca. 30% of the largest width. The plots shown in FIGS. 7-10 have similar profiles but it may be seen that the reflectance decreases as the largest width of the protrusions 104 increases: ca. 5-3.5% (FIG. 7), ca. 1.8-1.2% (FIG. 8), ca. 1-0.55% (FIG. 9), ca. 0.70-0.35% (FIG. 10). Thus these simulations demonstrate that the degree of the reflectance may be tuned by, for example, varying the largest width of the protrusions 104 but keeping the smallest width constant, i.e. by varying the degree of tapering.

Figure 14:
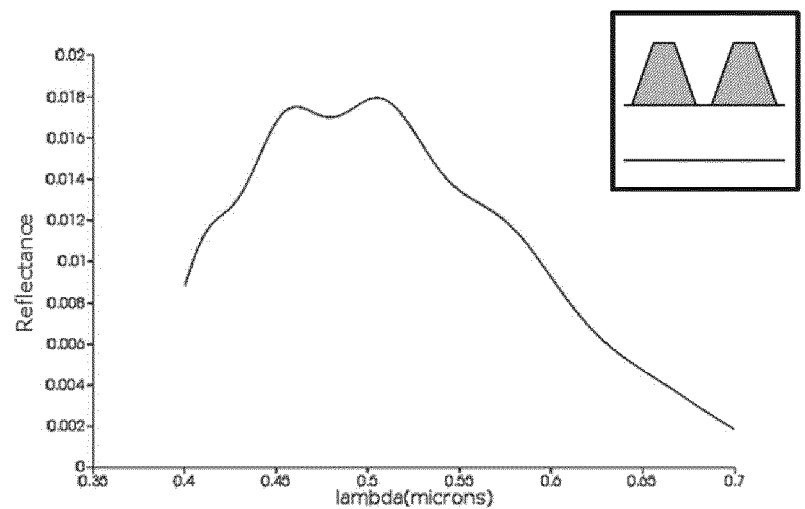

FIGS. 11-14 provide reflectance vs. wavelength plots for non-limiting examples of patterns comprising truncated pyramidal protrusions 104 (see inset of FIGS. 11-14). These patterns all have a period of 180 nm, a height of the protrusions 104 of 200 nm, and a largest width of the protrusions 104 of 190 nm. These patterns differ in terms of the smallest width of the protrusions 104: 20 nm (FIG. 11), 30 nm (FIG. 12), 50 nm (FIG. 13), and 90 nm (FIG. 14). Thus the smallest width varies from ca. 15% to ca. 50% of the largest width. The profile of these plots shows much more variation than observed for FIGS. 7-10. However, it may be seen that each of the patterns may display low reflectance: ca. 0.30-1.5% (FIG. 11), ca. 0.35-1.2% (FIG. 12), ca. 0.15-0.75% (FIG. 13), ca. 0.20-1.8% (FIG. 14). Thus, the variation in reflectance by varying the smallest width of the protrusions 104 but keeping the largest width constant may, for instance, mainly alter how the reflectance changes as a function of wavelength; the degree of reflectance may remain low, particularly in this range of dimensions of the protrusions 104.

In an embodiment, the tapering may be such that a smallest width of the protrusion 104 may be between 5% and 60% of a largest width of the protrusion 104. The foregoing simulations (FIGS. 7-14) demonstrate the low reflectance properties of the exemplified patterns when the smallest width as a percentage of the largest width of the tapering protrusion 104 is in this range. This range may further ensure good mechanical robustness of the layer 101: the tapering protrusions 104 may not become so thin that they may become too fragile. In addition, this range may, for example, ensure that the (Knoop) hardness of the layer 101 does not become too low at the extremities 106 to the detriment of abrasion resistance.

Figure 15:
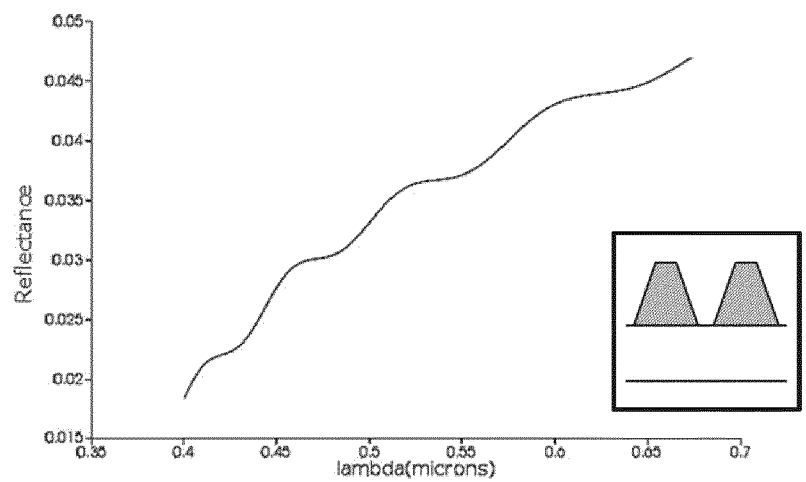
FIGS. 15-17 depict simulated plots of reflectance vs. wavelength for patterns comprising tapered protrusions according to yet further embodiments of the present invention.
Figure 16:
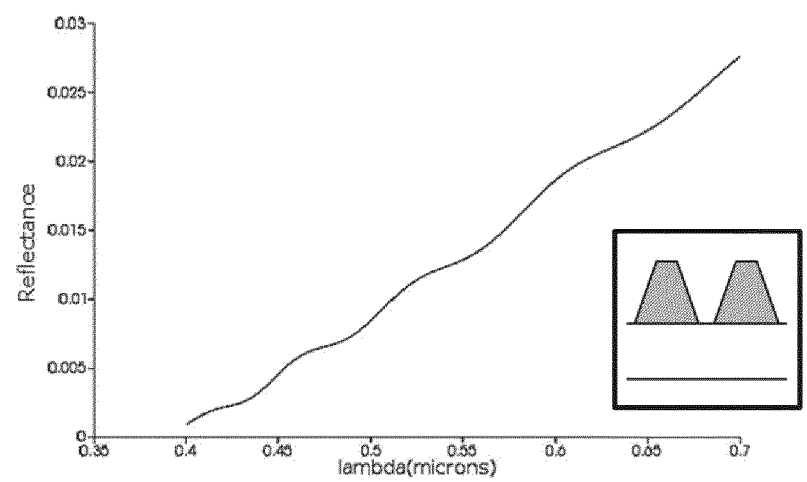
Figure 17:
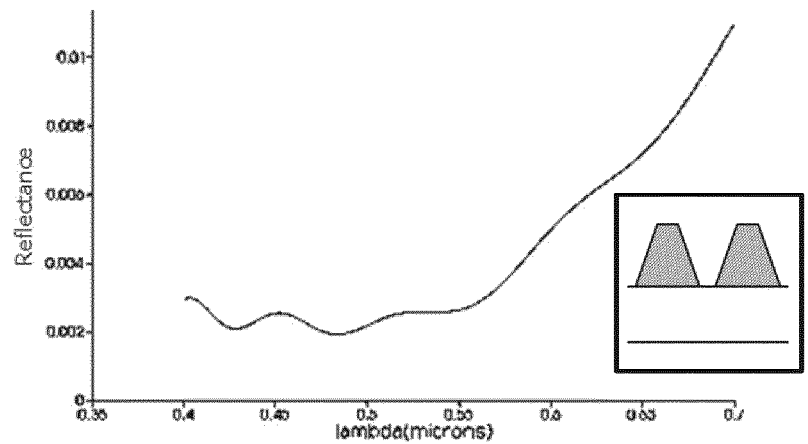

FIGS. 15-17 provide reflectance vs. wavelength plots for non-limiting examples of patterns comprising truncated pyramidal protrusions 104 (see inset of FIGS. 15-17). These patterns all have a period of 200 nm, a largest width of the protrusions 104 of 190 nm, and a smallest width of the protrusions 104 of 30 nm. The patterns differ in terms of the height of the protrusions 104: 100 nm (FIG. 15), 150 nm (FIG. 16), 200 nm (FIG. 17). The plots shown in FIGS. 15-17 have broadly similar profiles in which the reflectance generally increases with wavelength. It may further be seen from these examples that the reflectance may decrease as the height of the protrusions 104 increases: ca. 2.0-4.5% (FIG. 15), ca. 0.2-3.0% (FIG. 16), ca. 0.2-1.2% (FIG. 17). This may be ascribed to the greater height of the tapered protrusions 104 resulting in a more gradual gradient in refractive index (lower towards the extremities 106, higher towards the surface 102).

In an embodiment, a height of the protrusions 104 may range from 50 to 500 nm. A height in this range may ensure that, for example, a gradient in the refractive index of the layer 101 from the surface 102 to the extremities 106 may be sufficiently gradual so as to assist in reducing or removing discontinuities of refractive index at the air-layer and, in some embodiments, at the layer-substrate interface, thereby further assisting to reduce reflectance.

FIGS. 18-20 provide reflectance vs. wavelength plots for non-limiting examples of laminates 100 comprising truncated pyramidal protrusions 104 with the silica 105 interposed between the protrusions 104. The extremities 106 align with the exposed surface 107 in these non-limiting examples (see inset of FIGS. 18-20). The layers 101 all have a pattern with a period of 200 nm, a largest width of the protrusions 104 of 190 nm, and a smallest width of the protrusions 104 of 30 nm. The layers 101 differ in terms of the height of the protrusions 104: 100 nm (FIG. 15), 150 nm (FIG. 16), 200 nm (FIG. 17). Comparing these plots with the corresponding patterns which do not comprise the silica 105 (FIGS. 15-17), it may be seen that the respective profiles are quite different. The reflectance of the patterns (FIGS. 15-17) is also somewhat smaller than observed for the layers 101: ca. 2.2-3.6% (FIG. 18), ca. 2.2-4.5% (FIG. 19), ca. 3.0-4.5% (FIG. 20). This may simply be ascribed to the higher refractive index of the combined layer of sapphire and silica 105 having a higher effective refractive index compared to air. However, the layers 101 have the advantages of higher abrasion resistance, greater robustness and capability to exclude pollutants over the patterns which do not have the silica 105 interposed between the protrusions 104.

Whilst FIGS. 5A/B, 6A/B, 7-20 depict reflectance/transmittance versus wavelength plots for patterns with periods of 180 nm or 200 nm, this is not intended to be limiting. In an embodiment, a period of the pattern, may range from 10 to 350 nm. A period of the pattern being lower than 350 nm may assist in limiting or preventing interference phenomena of visible light, such as diffraction, thus enhancing the suitability of the layer 101 for protecting a surface 102 of visible light-transmissive substrates 103.

In alternative examples, the laminate 100 may be intended to be transmissive in the UV or IR regions of the spectrum. The dimensions of the protrusions 104, as well as the period of the pattern may be scaled accordingly. For example, UV applications may necessitate lower periods, e.g. less than 100 nm, such that interference effects (e.g. diffraction) for UV wavelengths may be limited or avoided.

On the other hand, depending on the intended application of the laminate 100, the period may be adjusted such that it may be, for example, similar to or larger than the wavelengths of the intended incident light. In such examples, the layer 101 may display interference-related optical effects (e.g. diffraction/layer interference colours). As previously described, in an embodiment wherein the layer 101 may comprise two regions 108A and 108B, the two regions 108A/B may exhibit different diffraction/layer interference colours relative to each other. These effects may, for example, be perceived with the naked eye and thus a layer 101 comprising such regions 108A/B may be used to provide a motif, such as a logo, anti-counterfeiting (e.g. 'hologram'-type) mark, decorative effect etc.

Figure 21:
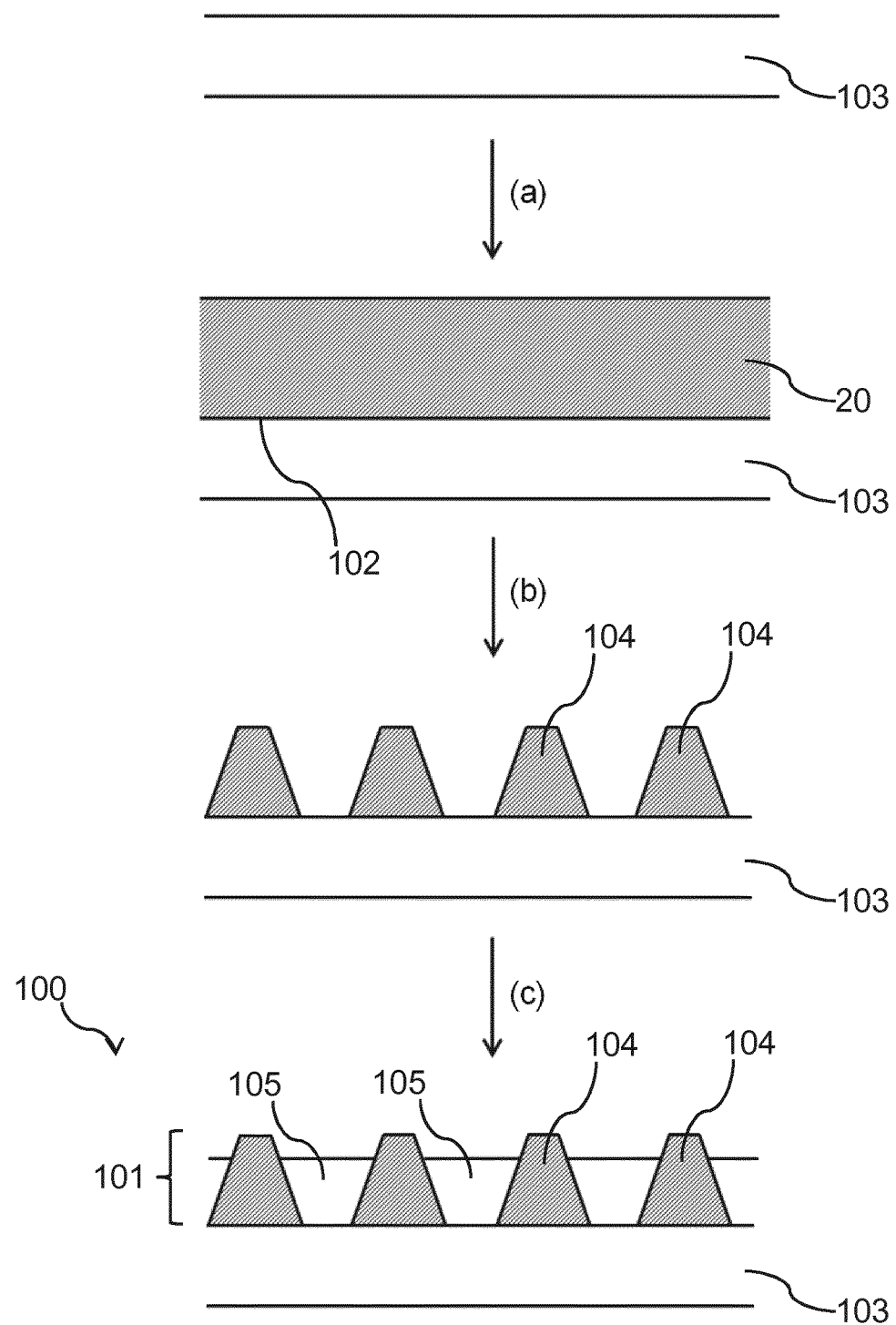
FIG. 21 schematically depicts a method of manufacturing the laminate according to an embodiment of the present invention.

With reference to FIG. 21, a method of manufacturing the laminate 100 according to an embodiment will now be described. In step (a) a layer 20 of the material may be provided on the surface 102 of the substrate 103. Whilst FIG. 21, shows the layer 20 being a separate layer with respect to the substrate 103, so long as the substrate 103 comprises a material which is harder than the silica 105 (e.g. sapphire), it may not be necessary to form a layer of another material on the substrate 103. In such examples, the providing a layer 20 may merely refer to a surface layer of the substrate 103.

In non-limiting examples where the layer 20 and the substrate 103 are compositionally distinct, the layer 20 may be applied to the surface 102 in any suitable manner, such as by chemical deposition (e.g. chemical vapour deposition) or physical deposition (e.g. sputtering). Such methods are well-known per se and so will not be further elaborated upon herein for the sake of brevity only. In step (b), the layer 20 may be structured to form a pattern of spatially separated protrusions 104 extending away from the surface 102. In step (c), the silica 105 may be applied to the pattern such that the silica 105 is interposed between the protrusions 104.

It should be noted that the means of structuring the layer 20 (step (b)) is not especially limited and may, for example, be carried out using any suitable method, such as a lithographic method. Such a lithographic method may, for example, include imprint lithography, interference lithography, X-ray lithography etc. In non-limiting examples wherein the substrate 103 and the layer 20 may have the same composition, the selected surface of the substrate 103 may be structured in step (b).

In an embodiment, the structuring in step (b) may comprise providing a patterned etch mask on the layer 20, the mask being patterned such that it covers portions of the layer 20 and leaves further portions uncovered; and selectively etching the layer 20 using the patterned etch mask such that the further portions are at least partially removed, thereby forming the pattern.

In a non-limiting example, the structuring may be achieved using an imprint lithography technique, e.g. Substrate Conformal Imprint Lithography (SCIL), an imprint lithography technique developed by Philips.

Figure 22:
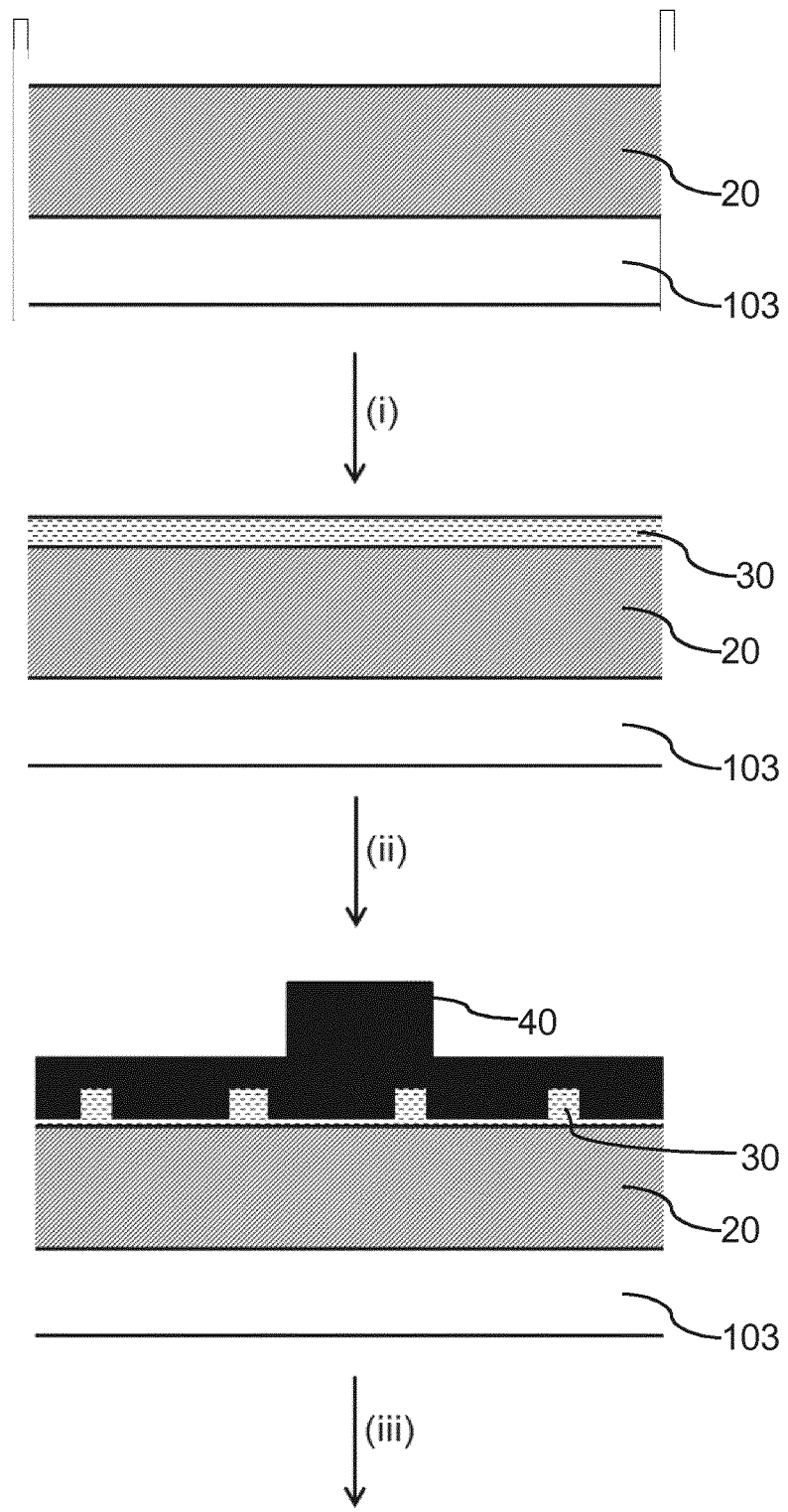
FIG. 22 schematically depicts a method of structuring the layer according to an embodiment of the present invention.
Figure 22:
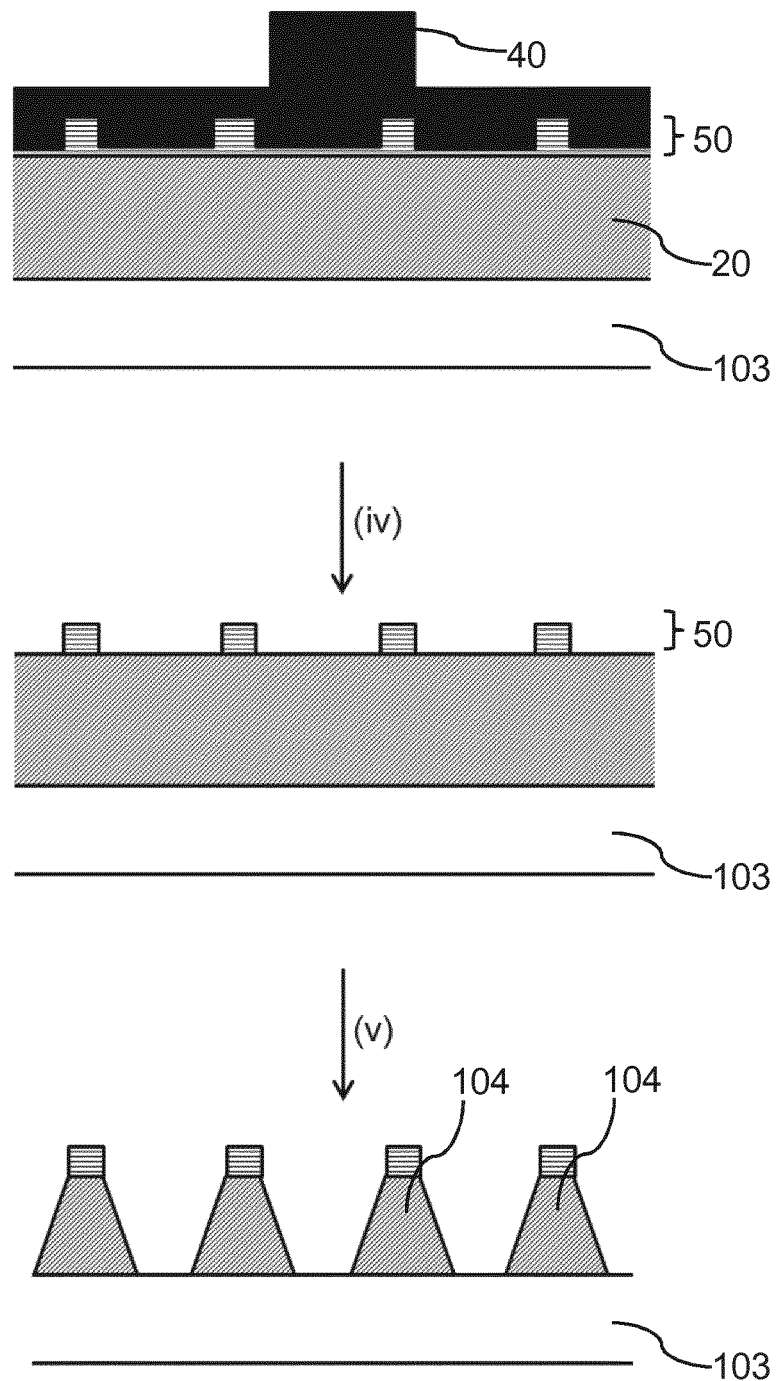

FIG. 22 schematically depicts such an imprint lithography process. In step (i) a pattern precursor layer 30 is provided on the layer 20, e.g. by spray coating, ink-jet printing or nebula/ultrasonic fog-generated coating etc. The pattern precursor layer 30 may comprise any suitable material, e.g. an organic or inorganic resist precursor material. As such materials are well-known per se and widely documented, a further description of the compositions of such materials is omitted for the sake of brevity only.

In step (ii) of FIG. 22 the pattern precursor layer 30 is imprinted with a patterned stamp 40. The patterned stamp 40 may be, for example, an elastomeric stamp having a major surface carrying a stamp pattern which may be imprinted into the pattern precursor layer 30, thereby transferring the stamp pattern, as shown in step (ii). The features of the stamp pattern may typically have dimensions (i.e. widths and heights), for example, of tens or hundreds of nanometers, or up to microns. The dimensions of the features of the stamp pattern may determine (at least in part) the dimensions of the protrusions 104. The stamp pattern may comprise two or more patterns which are different relative to each other such that a laminate 100 comprising a plurality of regions 108A/B may be fabricated. The stamp pattern may be formed in any suitable manner, for example by creating at least the major surface of the patterned stamp 40 in a master mold as is well-known per se. The patterned stamp 40 may, for example, be permeable and may be made of any suitable elastomeric material, e.g. a polysiloxane such as PDMS or another rubber-like material having a low Young's modulus, such as less than 80 MPa (as determined by a standardised hardness test according to the ASTM D1415-06 (2012) standard by penetrating the rubber material with a rigid ball under the conditions mandated by the standard). The patterned stamp 40 may be made from a bulk material or may be built up in layers of differing Young's modulus relative to each other. Such patterned stamps 40 are well-known per se and will not be further elaborated upon herein for the sake of brevity only.

In step (iii) of FIG. 22 the pattern precursor layer 30 may be developed into the patterned etch mask 50. This is signified in FIG. 22 by the change in fill pattern used to denote the pattern precursor layer 30. This may, for example, be achieved by curing the pattern precursor layer 30. This curing may, for example, occur as a consequence of imprinting the pattern precursor layer 30 with the patterned stamp 40. Optionally application of a stimulus such as heat and/or UV radiation may, for example, be also used to effect the curing. Means of curing of such pattern precursor layers 30 (e.g. comprising an organic or inorganic resist precursor material) are well-known per se and will not be further described herein for the sake of brevity only.

In step (iv) of FIG. 22 the patterned stamp 40 may be removed from the patterned etch mask 50.

In step (v) of FIG. 22, the pattern may be formed by selectively etching the layer 20 using the patterned etch mask 50 such that the further portions (left uncovered by the patterned etch mask) are at least partially removed, thereby forming the pattern. Means of etching the layer 20, e.g. reactive ion etching (which may be employed to etch surfaces of hard materials such as sapphire), are well-known per se and will not be further elaborated upon herein for the sake of brevity only.

The patterned etch mask 50 may optionally be removed following the etching (not shown in FIG. 22). This may be done by, for example, dissolving the patterned etch mask 50 in a suitable solvent, as is well-known per se.

Figure 23:
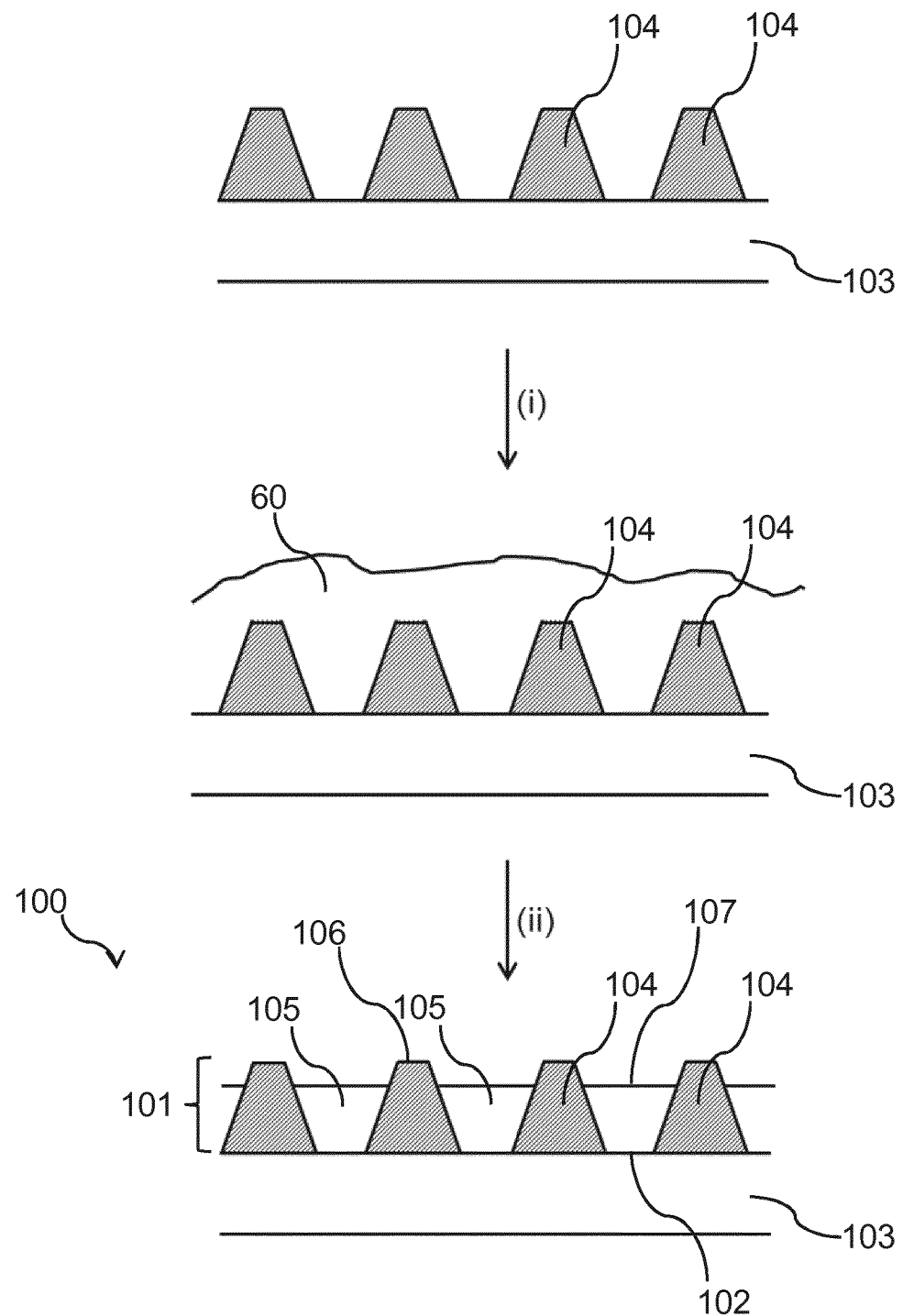
FIG. 23 schematically depicts a method of applying the silica according to an embodiment of the present invention.

FIG. 23 schematically depicts the applying of the silica 105 according to an embodiment. In step (i) of FIG. 22, the silica 105 may be deposited such that a silica over-layer 60 is formed which immerses the pattern. The means of deposition of the silica 105 are not especially limited and may, for example, comprise chemical vapour deposition (CVD) techniques such as plasma enhanced (PE-CVD) or low pressure (LP-CVD) chemical vapour deposition. The conditions employed during such deposition processes may be adjusted in order to tune, for example, the density of the silica 105, thereby permitting a degree of control to be exerted, for example, over $HK_{sil}$ and $n_{sil}$. The deposition conditions may necessitate elevated temperatures. The lower coefficient of thermal expansion of the silica 105 (0.5 ppm/K), for example, with respect to the substrate 103 (e.g. sapphire; CTE=8 ppm/K) may be such that during cooling (i.e. following deposition) the substrate 103 may contract to a greater degree than the silica 105.

In a particularly advantageous embodiment, the layer 101 may be annealed after deposition of the silica to a temperature of at least about 1150° C. at which temperature the silica obtains fluidic properties such that stress within the silica is released. This results in a dense, stress-free silica. Subsequent cooling to room temperature ensures that a compressive stress is imparted on the silica. The resulting compressive stress may render the layer 101 more robust, for example more resistant to cracking, and with greater resilience with respect to abrasion. Given that such suitable deposition methods are well-known per se, they will not be further elaborated upon herein for the sake of brevity only.

The silica over-layer 60 may then be subjected to a thinning process (e.g. etching) by which the silica 105 may be partially removed. This may, for example, be achieved by using one or more of wet, dry, and mechanical polishing techniques. Such techniques for removing excess inorganic material (e.g. silica) are well-known per se. The partial removing of the silica 105 may be such that extremities 106 of the protrusions 104 align with an exposed surface 107 of the silica 105 opposing the surface 102, or protrude from the exposed surface 107, as previously described and as shown in FIG. 23 by way of non-limiting example.

Figure 24A:
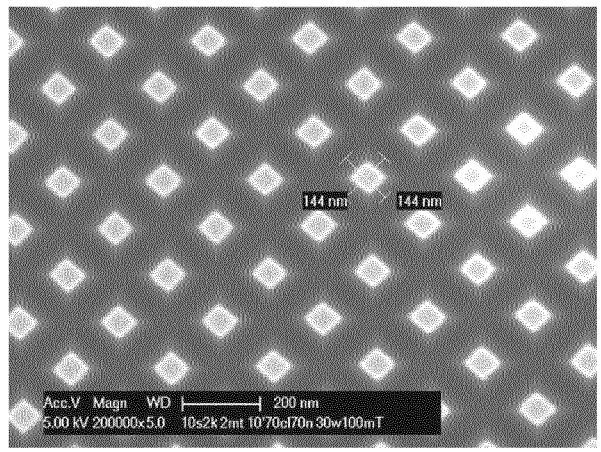
FIG. 24A depicts an electron microscopy image of a pattern of a mold master viewed directly from above.
Figure 24B:
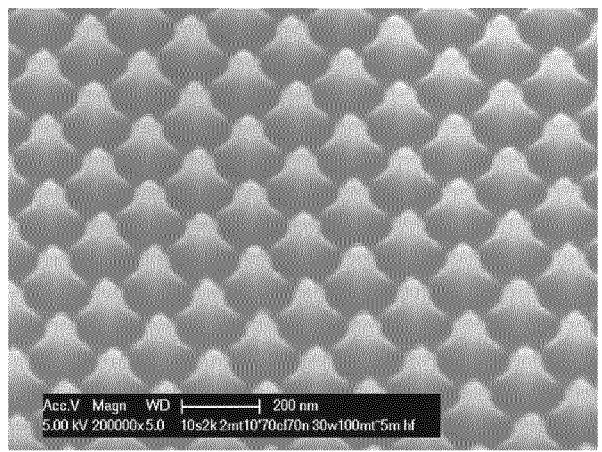
FIG. 24B depicts an electron microscopy image of the pattern in FIG. 24A viewed from an angle of ca. 45° from the vertical.
Figure 25A:
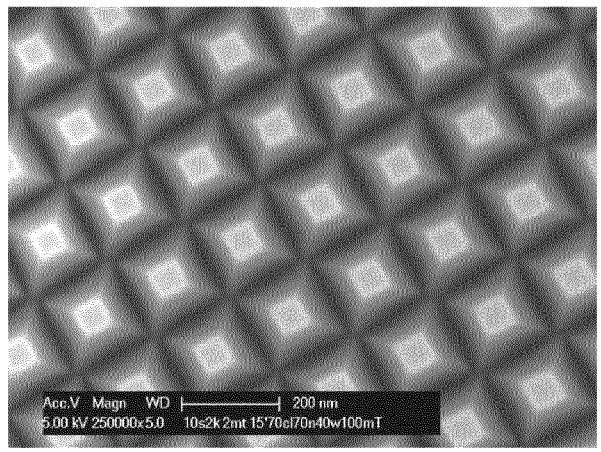
FIG. 25A depicts an electron microscopy image of a further pattern of a mold master viewed directly from above.
Figure 25B:
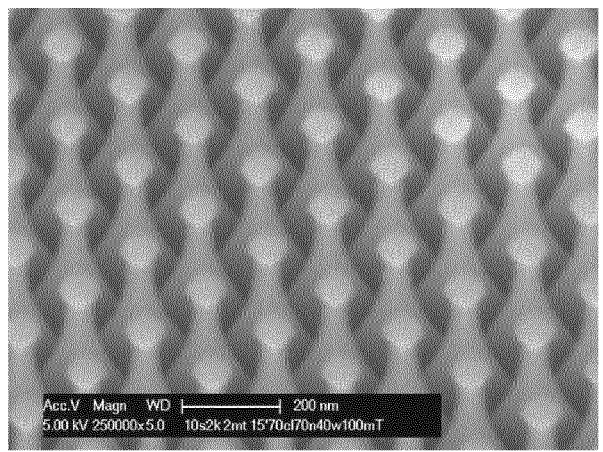
FIG. 25B depicts an electron microscopy image of the pattern in FIG. 25A viewed from an angle of ca. 45° from the vertical.

It will be clear from the foregoing that in embodiments wherein the structuring is carried out using a patterned etch mask 50, the pattern may derive from the patterned stamp 40. Such a patterned stamp may, for example, be fabricated from a master mold in which the 3D structure is controlled as is well-known per se. FIG. 24A/B and FIG. 25 A/B depict electron microscopy images of non-limiting examples of such master molds. In these examples, the master molds are formed of etched silicon (the initial etch mask used to form these structures is still present in these figures); the pattern having a period of 180 nm. It may be observed from the different patterns shown in FIGS. 24B and 25B (viewed from an angle of ca. 45° from the vertical) that the period, width and shape of the features of the master mold may be varied. Thus the period, shape/dimensions of the protrusions 104, and thus the volume fraction of the material ($vf_m$) of the layer 101 may be (at least partly) determined by the mold master.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A laminate comprising:
   an abrasion resisting layer disposed on a first surface of an optically transmissive substrate,
   wherein the abrasion resisting layer comprises a pattern of spatially separated protrusions,
   wherein the protrusions comprise a material extending away from the first surface,
   wherein silica is interposed between the protrusions,
   wherein the material has a Knoop hardness measured according to ASTM E384 Knoop Hardness Standard which is greater than that of the silica.

2. The laminate of claim 1,
   wherein the silica has a first silica surface and a second silica surface,
   wherein the second silica surface is further away from the first surface than the first silica surface,
   wherein the protrusions comprise extremities,
   wherein the extremities align with the second silica surface.

3. The laminate of claim 1, wherein the protrusions taper in a direction away from the first surface.

4. The laminate of claim 3, wherein the protrusions are truncated.

5. The laminate of claim 3,
   wherein the protrusions are tapered,
   wherein the taper is such that a smallest width of the protrusion is between 5% and 60% of a largest width of the protrusion.

6. The laminate of claim 1, wherein the protrusions comprise at least one of a cone-shape, a truncated cone shape, a hyperboloid shape, a pyramid shape, a truncated pyramid shape, a dome shape, and a truncated dome shape.

7. The laminate of claim 1, wherein the material comprises one or more of sapphire, silicon nitride, cubic boron nitride, and diamond.

8. The laminate of claim 1, wherein the substrate is selected from the group consisting of sapphire or diamond.

9. The laminate of claim 1, wherein a period of the pattern ranges from 10 to 350 nm.

10. The laminate of claim 1,
    wherein the silica has a first silica surface and a second silica surface,
    wherein the second silica surface is further away from the first surface than the first silica surface,
    wherein the protrusions comprise extremities,
    wherein the extremities protrude from the second silica surface.

11. The laminate of claim 1,
    wherein the layer comprises a first region and a second region,
    wherein the first region has a first pattern,
    wherein the second region has a second pattern,
    wherein the second pattern is different from the first pattern such that the first region and the second region have different optical interference properties relative to each other.

12. The laminate of claim 1, wherein each protrusion has a height from the first surface that is between 50 nm and 500 nm.

13. A laminate comprising:
    an abrasion resisting layer disposed on a first surface of an optically transmissive substrate,
    wherein the abrasion resisting layer comprises a pattern of spatially separated protrusions,
    wherein the protrusions comprise a material extending away from the first surface,
    wherein silica is interposed between the protrusions,
    wherein the material has a Knoop hardness measured according to ASTM E384 Knoop Hardness Standard which is great than that of the silica,
    wherein the layer comprises a first region and a second region,
    wherein the first region has a first pattern,
    wherein the second region has a second pattern,
    wherein the second pattern is different from the first pattern such that the first region and the second region have different refractive indices relative to each other.

14. The laminate of claim 13,
    wherein the first pattern comprises protrusions of a first shape and the second pattern comprises protrusions of a second shape,
    wherein the first shape is different than the second shape.

15. The laminate of claim 13,
    wherein the silica has a first silica surface and a second silica surface,
    wherein the second silica surface is further away from the first surface than the first silica surface,
    wherein the protrusions comprise extremities,
    wherein the extremities protrude from the second silica surface.

16. A method of manufacturing a laminate, the method comprising:
    providing an abrasion resisting layer of a material on a first surface,
    structuring the abrasion resisting layer to form a pattern of spatially separated protrusions, wherein the protrusions extend away from the first surface; and
    applying silica to the pattern such that the silica is interposed between the protrusions,
    wherein the material has a Knoop hardness measured according to ASTM E384 Knoop Hardness Standard which is greater than that of the silica, wherein the structuring comprises providing a patterned etch mask on the layer, the mask being patterned such that it covers portions of the layer and leaves further portions uncovered, and wherein the structuring further comprises selectively etching the layer using the patterned etch mask such that the further portions are at least partially removed, thereby forming the pattern.

17. The method of claim 16, wherein the providing of a patterned etch mask comprises providing a pattern precursor layer on the layer, wherein the providing of a patterned etch mask comprises imprinting the pattern precursor layer with a relief pattern of a patterned stamp, wherein the providing of a patterned etch mask comprises developing the pattern precursor layer into the patterned etch mask, wherein the providing of a patterned etch mask comprises removing the patterned stamp from the patterned etch mask.

18. The method of claim 17 wherein the patterned stamp comprises a flexible material having the relief pattern.

19. The method of claim 16, wherein the silica has a first silica surface and a second silica surface, wherein the second silica surface is further away from the first surface than the first silica surface, wherein the applying comprises depositing the silica such that it immerses the pattern, wherein the applying further comprises partially removing the silica such that extremities of the protrusions align with the second silica surface.

20. The method of claim 16, wherein the silica has a first silica surface and a second silica surface, wherein the second silica surface is further away from the first surface than the first silica surface, wherein the applying comprises depositing the silica such that it immerses the pattern, wherein the applying further comprises partially removing the silica such that extremities of the protrusions protrude from the second silica surface.

* * * * *